Aug. 5, 1969 A. H. GREER 3,459,672
COMPOSITE SPHEROIDAL PHOSPHORESCENT ORGANIC
POLYMER ARTICLE AND PROCESS
Filed May 18, 1966 2 Sheets-Sheet 1

INVENTOR.
ALBERT H. GREER

BY Theodore B Roessel

ATTORNEY

United States Patent Office 3,459,672
Patented Aug. 5, 1969

3,459,672
COMPOSITE SPHEROIDAL PHOSPHORESCENT ORGANIC POLYMER ARTICLE AND PROCESS
Albert H. Greer, Haddonfield, N.J., assignor to Sybron Corporation, a corporation of New York
Filed May 18, 1966, Ser. No. 551,071
Int. Cl. C09k 1/12; C08f 19/20, 19/04
U.S. Cl. 252—301.3
9 Claims

ABSTRACT OF THE DISCLOSURE

Long-termed phosphorescent spheroidal particles, the individual particles being made of translucent, crosslinked organic polymers having embedded in the surface area particles of a long-termed phosphorescent inorganic compound. Suitable inorganic long-termed phosphors are the sulfides of calcium, strontium, zinc and cadmium. The spheroidal particles are produced by forming suspensions of inorganic phosphorescent particles in the monomer and suspension polymerizing the monomer in an aqueous phase. The pH of the aqueous phase is maintained between 7 and 14.

This invention relates to a composite spheroidal article having phosphorescent properties, and to a process for its preparation. In particular, this invention relates to a composite substantially spheroidal and translucent organic polymer article which has a substantially spheroidal body of substantially translucent, crosslinked organic polymer in combination with a plurality of inorganic phosphorescent compound granules that are disposed at the surface of and substantially about the surface of said body; and further relates to an organic suspension polymerization method for the preparation of this article.

In the phosphorescent material arts, use has been made of spheroidal polymeric articles having scintillating properties, such as is disclosed in U.S. Patent 3,150,101. Further, use has been made of crosslinked organic polymeric articles having dissolved therein phosphorescent material, such as is disclosed in U.S. Patent 3,214,383. To the present time, however, it has not been possible to provide spherical phosphorescent articles which have long-termed phosphorescent properties, such as are provided by inorganic phosphors such as the sulfides of calcium, strontium, zinc, cadmium and other metals. The reason made evident by the prior art has been an inability to dissolve the long-termed phosphorescent inorganic substances within a polymeric matrix, or to otherwise combine said phosphors with a polymeric matrix. The prior art, therefore, has employed organic phosphors which by their nature emit only short-termed phosphorescence, and which phosphors have been dissolved within the polymeric matrixes disclosed.

It is an object of this invention to provide substantially spheroidal articles having phosphorescent properties imparted by inorganic phosphorescent compound granules. It is a further object of this invention to provide a substantially spheroidal article having long-termed phosphorescent properties, said article being formed from a crosslinked organic polymer.

Figure 1:
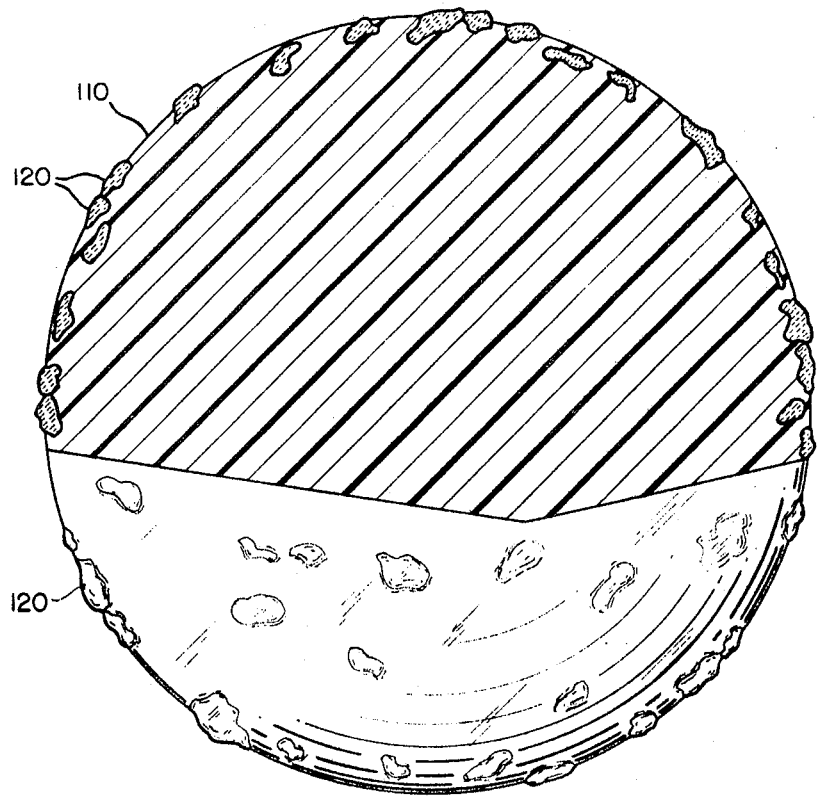
Figure 2:
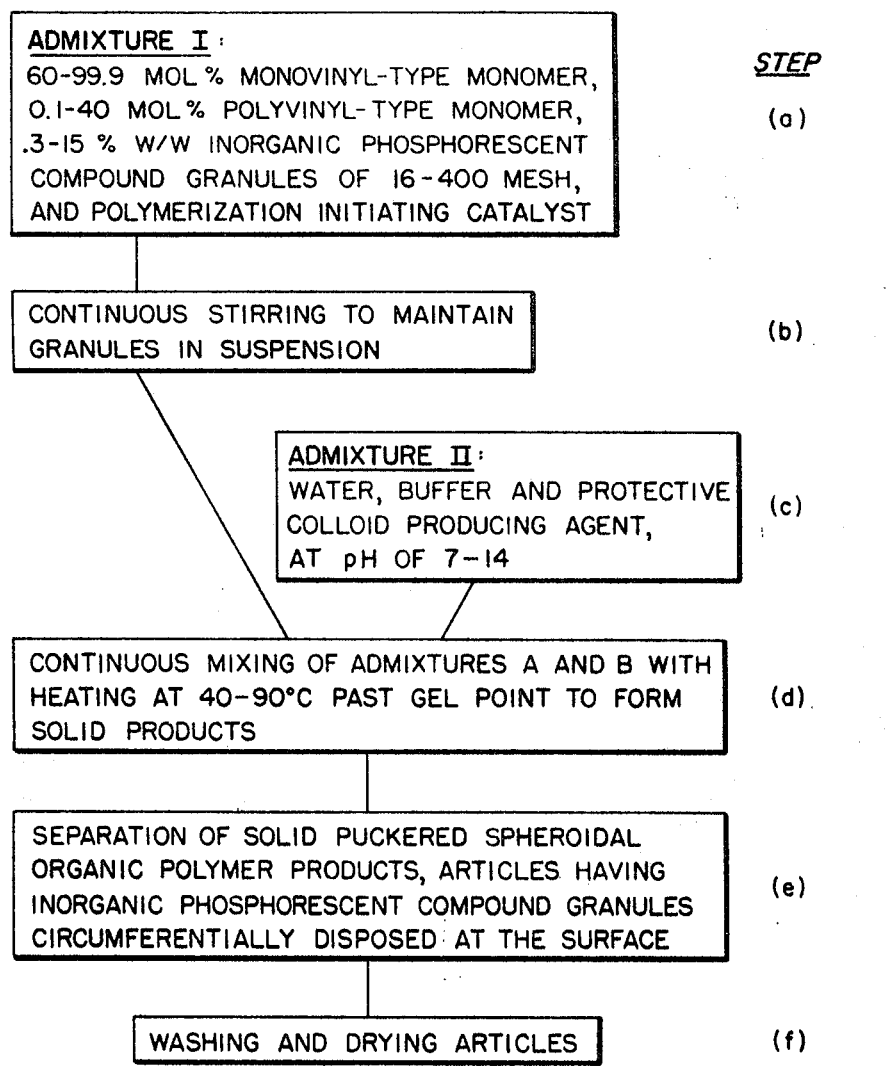

Other desirable objects of this invention are inherent in or apparent from the following descriptions, explanations, examples, and drawings embodied in FIGURES 1 and 2.

FIG. 1 is a partial cross-sectional view of a composite substantially spheroidal organic polymer article of this invention having phosphorescent properties comprising a partially puckered surfaced, substantially spheroidal body of substantially translucent crosslinked organic polymer and a plurality of inorganic phosphorescent compound granules disposed at the surface and about the surface of the polymer body.

FIG. 2 is a flow chart of the preparation process of the invention for making articles of the invention.

It has now been found that the objects of this invention may be substantially attained by providing articles which are substantially spheroidal and translucent and have imbedded at their surfaces and about their surfaces phosphorescent inorganic compound granules. For the purposes of this invention, by "translucent" is meant the property of permitting light to pass through, either in a diffusely scattered form, or with no diffusion such as occurs in transparent substances. The phosphorescence exhibited by the surfaces of articles of this invention, it has been found, is long-termed, which is to say that phosphorescent emission of light from such surfaces persists for periods of hours, even to 6 to 12 hours, after exciting radiation has been removed. The surface disposition of the phosphor granules of the present article provides for maximum efficiency in their excitation by a source of exciting radiation, and also provides for maximum efficiency in providing useful phosphorescence. The translucent nature of the body of the present article further permits any phosphor granules which may be at the surface of the article but completely within the polymer body to be excited and to emit phosphorescence with maximum efficiency. The crosslinked nature of the polymer body, it has been further found, substantially resists dissolution by aqueous and organic liquids, so that articles of the present invention may be employed in liquid media such as varnishes or in aqueous dispersions to be used as phosphorescent paints or in silk screening printing inks.

It has been found that the unusual articles of this invention may be prepared by copolymerizing by suspension techniques at least one monovinyl-type monomer, which is to say an organic monomer containing a single

group per molecule with at least one polyvinyl-type monomer, which is to say a monomer containing at least two

groups per molecule in mol ratios of about 60 to 99.9 mol percent of monovinyl-type monomer to about 0.1 to 40 mol percent of polyvinyl-type monomer, in the presence of about .3 to 15 percent by weight of a plurality of inorganic phosphorescent compound granules. In this suspension polymerization process the inorganic granules, desirably having an average size of from 16 to 400 mesh, U.S. Standard Sieve, are admixed with the monovinyl-type and polyvinyl-type monomers and an effective quantity of a vinyl polymerization initiating catalyst to form a single admixture, Admixture I of FIG. 2. It is vital to the successful practice of this invention that the admixture so prepared be continuously stirred to maintain the granules of inorganic phosphorescent compound in suspension prior to use of the admixture in the copolymerization step (d) of FIG. 2. Another admixture, Admixture II of FIG. 2, is prepared of water, a protective colloid producing agent useful in maintaining the suspension droplet size desired, and an effective amount of a buffering material sufficient to maintain this admixture at a pH within the range of from 7 to 14. The pH level is critical for upon subsequent mixing and polymerization of the two admixtures, I and II, a pH of less than 7 would deleteriously affect the inorganic phosphorescent granules by chemical reaction therewith. If the phosphors are metallic sulfides, noxious fumes are produced during the copolymerization step, having the odor of hydrogen sulfide. The two admixtures are mixed together continuously with heating, preferably at temperatures of about 40 to 90° C. past the gel point of the copolymers to form solid products. The solid products so formed are articles of this invention which have substantially spheroidal bodies of substantially translucent crosslinked organic polymer. The surface of such bodies contain a plurality of inorganic phosphorescent compound granules imbedded therein, which granules often give the surface a puckered appearance as portions of the granules seem to push up the surface in diverse places. Microscopic examination of the spheroidal articles produced show the body of organic polymer to be translucent and substantially devoid of inorganic phosphorescent granules except at the substantially spheroidal surface, such as may be seen in FIG. 1. The solid product articles are then, according to the invention, separated from the liquid portions of the polymerization medium, say by filtration, etc. The separated spheroidal phosphorescent articles are then washed, say with water and/or an organic solvent such as acetone or ethyl alcohol to free the surfaces of undesirable impurities which may deleteriously affect their phosphorescent properties. The articles are then dried, say by vacuum or dessication.

The monovinyl-type unsaturated monomers which are suitable for this invention include the following: styrene, vinyl toluene, vinyl xylene, vinyl ethylbenzene, vinyl naphthalene, acetanaphthylene, vinyl diphenyls, vinyl diphenyloxides, and similar unsaturated compounds; methyl acrylate, ethyl acrylate, propyl acrylate, butyl acrylate, benzyl acrylate, and corresponding esters of methacrylic acid; vinyl acetate, vinyl propionate, vinyl butyrate, vinyl methacrylate and similar unsaturated compounds; methyl vinyl ether, ethyl vinyl ether, propyl vinyl ether and similar unsaturated compounds; methyl vinyl ketone ethyl vinyl ketone, propyl vinyl ketone and similar unsaturated monomers. The monovinyl moiety may also include nuclear and aliphatic substitution such as by halogens, nitro, cyano and similar substituents. Another class of suitable monovinyl-type monomers include nitrogen heterocyclic compounds, such as the vinylpyridines: 2-vinylpyridine, 4-vinylpyridine, 3-vinylpyridine, 2-methyl-5-vinylpyridine and similar unsaturated compounds; the vinylquinolines such as 2-methyl-5-vinylquinoline, 4-methyl-4-vinylquinoline and the vinylpyrrolidenes. Another class of monovinyl-type monomers is the dialkyl unsaturated esters such as dialkylmaleate, dialkyfumarate, dialkylitaconate and other similar compounds. Another class of suitable monovinyl-type monomers is the sulfur containing heterocyclic monomers such as the vinylfuranes, vinylthiophenes and similar unsaturated monomers. Among the monovinyl-type monomers, styrene is preferred.

Among the polyvinyl-type crosslinking monomers which may be used are monomers containing two or more vinyl groups such as: divinylbenzene, divinyltoluene, divinylnaphthalene, divinylethylbenzene, divinylxylene, divinylpyridine, diallylphthalate, ethylene glycol diacrylate, ethylene glycol dimethacrylate, diallyl maleate, diallyl fumarate, diallyl succinate, diallyl carbonate, diallyl malonate, diallyl oxylate, and similar divinyl compounds; N'-methylenedimethacrylamide, N,N'-methylenediacrylamide and other similar compounds. Other monomers which contain more than two vinyl groups and which are suitable as crosslinking agents include trivinylbenzene, trivinylnaphthalene, trivinylanthracene. The divinyl and trivinyl compounds may also be nuclear halogenated or alkylated, and the aliphatic crosslinking agents may have halogen substituents. Among the polyvinyl-type monomers, the divinylbenzenes are preferred.

The copolymer formed by the reaction between the monovinyl-type monomer and the crosslinking polyvinyl-type monomer should contain on a molar basis a predominant amount of the monovinyl compound. It is preferred that the monovinyl-type monomer constitute from 60–99.9 mol percent of the copolymer. Optimum translucency results when said monovinyl-type monomer comprises 92 to 99 mol percent of the copolymerized spherical article.

With respect to inorganic phosphorescent compound granules which may be used as a part of the composite article and in the process of this invention, any particulated inorganic mineral having phosphorescent properties may be employed which is substantially non-reactive with the foregoing monomers, with water, with the polymerization initiator employed, with the buffering material employed, and with the protective colloid producing agent employed. Among these one may include granules of the metal sulfides which exhibit phosphorescent properties, such as calcium, strontium, zinc, cadmium sulfides and mixtures thereof. By "mixtures" is meant not only admixtures of granules of two or more of the inorganic phosphorescent compounds, but also solid granule compositions wherein two or more of the inorganic phosphorescent compounds appear to be in a single crystalline lattice such as may occur in preparation by coprecipitation or solid solution processes. The average size and type of the particulated inorganic phosphors to be used in any particular embodiment of the present process to prepare any particular embodiment of the present article is experimentally determinable depending upon the desired phosphorescent properties of the end article of this invention. However, the range of useful sizes for such granules falls between about 16 to 400 mesh, U.S. Standard Sieve. The weight quantity of inorganic phosphorescent compound granules to be employed in the present process falls within a critical range of from about .3 to 15 percent by weight of the total of monomers employed. Below about .3 percent by weight, it has been found that an insufficient amount of phosphorescent material is present to provide the desired phosphorescent properties of the end phosphorescent polymeric spheroids. When greater than about 15 percent by weight of inorganic phosphorescent compound granules is employed in the present process the excessive amounts of phosphors are thrown out of the polymerizing monomer spheroids into the disperse aqueous-buffered phase during the polymerization process of the present invention, and thus are lost or are only difficultly recovered for reuse.

With respect to the useful protective colloid producing agent presently suitable, they may include those substances commonly used in the suspension polymerization arts such as gelatin, gum arabic, and other natural gums, casein, carboxymethyl cellulose, 2-hydroxyethyl cellulose and similar cellulosic protective colloid producing agents and the sundry aryl amides commonly found useful; and such inorganic protective colloid producing agents and suspension aids as tricalcium phosphate, and other phosphates, magnesium silicate, and other silicious suspension aids. It has been found that, although such agents are well known in type and have been used in diverse quantities for diverse purposes, for the purposes of the present invention an effective amount of protective colloid producing agent must be present in the aqueous disperse phase in concentrations of from about 0.5 to 3.0 weight percent, based upon the weight of water employed. Below 0.5 weight percent insufficient agent is present to prevent agglomeration of the forming phosphorescent articles during the polymerization process. Although some small excess of colloid producing agent above 3.0 weight percent may, under special circumstances, be tolerated, it has been found that, in general, substantial excesses greater than this amount will adversely affect the physical structure of the end spheroidal phosphorescent article produced.

Suitable vinyl polymerization initiator catalysts include ozone, oxygen, organic peroxides such as cetyl peroxide, tertiary butyl hydroperoxide, benzoyl peroxide, hydrogen peroxide, so called "per-salts" such as water soluble persulfates and the azoketonitriles such as azo-bis-isobutyronitrile and azo-bis-cyclopropylpropionitrile. These may be employed in suitable amounts ranging from 0.1%–2% by weight based on the weight of the monomeric materials to be polymerized.

With respect to the amounts of water which desirably may be used in the suspension polymerization process, it has been found that the range of ratios of weight of the total of monomers to that of water may be from about 1:1 to 1:10, and preferably is about 1:2.5.

With respect to the order of addition of the monomers-containing admixture, which according to the invention must be under continuous stirring, and the aqueous buffered admixture, it is preferred that the continuously stirred monomers-containing admixtures to be added to the aqueous buffer-containing admixture for better particle size control of the phosphorescent spheroidal article produced. Thus, the continuously stirred monomers-containing admixture is added to the aqueous buffer-containing admixture, which latter also must be stirred during the process of addition in order that the monomers-containing admixture be under constant stirring.

The polymerization initiating catalyst must, according to the invention, be added to the monomers-containing admixture prior to suspension polymerization, rather than to the aqueous buffer-containing admixture, in order that polymerization be carried successfully beyond the gel point and to the desired solid spherical phosphorescent article produced. Further, such incorporation of the catalyst into the monomers-containing admixture also is necessary to prevent a throwing-out of the phosphor granules from the polymerizing monomer spheroids during the process. Therefore, it is also necessary, due to the presence of the polymerization initiating catalyst, that the monomers-containing admixture, prior to its addition to the aqueous buffer-containing admixture, be kept at a temperature below the decomposition temperature of the initiator, that is to say at a temperature below which the initiator will form free-radicals and induce premature polymerization; suitable temperatures for maintaining the catalyst-containing and monomer-containing admixture are between about 20 to about 50° C. for most catalysts.

It is important to the practice of the present invention that the inorganic phosphor granules be wetted by the organic monomers, and therefore one may readily see the necessity of adding the inorganic phosphor granules to the monomers-containing admixture rather than the aqueous buffer-containing admixture.

With respect to the average size of the spheroidal phosphorescent polymeric articles of this invention, they may be prescribed by the well known techniques involved in the suspension polymerization arts; usually, the most useful articles of the present invention are of average size from about 2 to 200 mesh. It is readily apparent that the inorganic phosphorescent compound granules to be used to produce articles of size 2 to about 200 mesh must be, in size, smaller than the size of the articles in order that a plurality of such granules be distributed about the surfaces of the articles. Proper choice of granule size to article size, following the teaching of the present invention is well within the ordinary skill of a practitioner of the polymerization arts, to achieve particular desired end composite spheroidal phosphorescent articles of the invention.

Turning to the figures, in FIG. 1, the present article is depicted as having a puckered surfaced substantially spheroidal body of substantially translucent crosslinked organic polymer 110, and a plurality of inorganic phosphorescent compound granules 120 disposed at the surface and about the surface of the organic polymer body. Some of the granules are shown to be at the surface and within the spheroidal surface, while other granules, which produce a puckering of the surface, are shown at the surface and pushing up the surface of the article at diverse points. In FIG. 2, the flow chart of the preparation process for the instant article of this invention depicts in steps (a) to (f) the preparation and constituents of the monomers-containing admixture (Admixture I) and the aqueous buffer-containing admixture (Admixture II), the necessary continuous stirring of Admixture I, the suspension copolymerization of the monomers in step (d), the separation of the product articles obtained, and the washing and drying of the articles of the invention.

The following examples illustrate the practice of the invention, the preparation of articles of the invention and their nature, but do not seek to limit its scope.

Example 1

Approximately 289.3 grams of styrene and 30 grams of polystyrene were heated to 50° C. until complete solution had taken place. The mixture was cooled to room temperature, and there was added thereto 11.5 grams of a mixture of 55% divinyl benzene and about 45% by weight of ethylvinyl benzene (approximately 2% by weight of the styrene monomer), 2 grams of azo-bis-isobutyronitrile polymerization initiator catalyst and 6 grams of a blue phosphor of calcium sulfide and strontium sulfide granules of a fine mesh (about 100 to 200), to form a first admixture. This admixture was kept under continuous stirring so as to maintain the phosphor granules in suspension. A second admixture was prepared in a two liter flask equipped with a stirrer, thermometer and an external water bath with 1,200 ml. of water, 4 grams of boric acid and 3.6 grams of sodium hydroxide to form a buffer solution at a pH of about 10 to 12. To the aqueous buffered solution was dissolved approximately 2 grams of commercial casein, a protective colloid producing agent. The monomers-mixture was then added to the stirred aqueous buffered mixture, and the resulting suspension polymerization reaction mixture thus provided was heated for from 4 to 5 hours with continuous stirring past the gel point until complete polymerization had occurred and spherical articles of from 20 to 40 mesh had been obtained. The articles were separated by filtration from the liquid portions of the polymerization medium, and then washed with water and air dried.

Microscopic examination of the articles obtained revealed substantial spheroidal translucent bodies of polymer which had phosphorescent granules distributed at and about their surfaces, as shown in FIG. 1. The phosphorescent spherical articles were irradiated with ordinary day light and when placed in a darkened room glowed with a blue light for several hours. Subsequently ultraviolet irradiation of the articles produced similar results.

Example 2

In similar manner to that employed in Example 1 a first mixture was prepared with 970 grams of styrene, 230 grams of a mixture of 52% by weight of divinyl benzene and about 48% ethylvinyl benzene, 14 grams of azo-bis-isobutyronitrile and 96 grams (8% by weight of the monomers) of a fine mesh calcium and strontium phosphor. The monomers admixture was continuously stirred to maintain the phosphor granules in suspension. A second admixture in an eight liter stainless steel kettle equipped with a stirrer, thermometer and an external heating bath was prepared with 3,000 ml. of water, 9 grams of sodium hydroxide, 12 grams of boric acid (to form a buffered mixture of pH of about 9 to 10) and 6 grams of casein. The second admixture was heated and maintained at 70° C.

The first admixture containing the monomers and the calcium sulfide and strontium sulfide granules was poured into the aqueous buffered admixture with continuous stirring. Stirring and heating was maintained over a 4 hour period during which the polymerizing monomers passed their gel point to form solid substantially spheroidal phosphorescent articles of size —80+200 mesh, U.S. Standard Sieve. The sperical articles were separated from the liquid portions of the polymerization medium, and then washed with water and dried under vacuum at about 60° C. The articles when exposed to ordinary room light, and then placed in a darkened room exhibited a phosphorescent after-glow for several hours. Microscopic examination of the articles showed substantially spheroidal translucent bodies of polymer which had phosphorescent granules distributed at and about their surfaces such as is shown in FIG. 1.

Example 3

In similar manner to that employed in Example 2, a first mixture of monomers, polymerization catalyst, and calcium sulfide and strontium sulfide phosphors was prepared according to the recipe:

Component:
Methyl methacrylate _____weight in grams__ 364
Crosslinking monomer mixture _____do____ 36
  Divinylbenzene _____percent of mixture__ 56.2
  Ethylvinyl benzene _____do____ 45.8
Azo-bis-isobutryonitrile _____weight in grams__ 2.4
Calcium-strontium sulfide phosphor _____do____ 20

A second aqueous buffered admixture was prepared in similar fashion to that in Example 2 employing 1,000 ml. of water containing an effective amount of boric acid-sodium hydroxide to maintain a pH of about 10. The second admixture was heated to 70° C. and 3 grams of casein were added thereto.

The first admixture was continuously stirred and poured into the second admixture; the resulting suspension polymerization system was continuously stirred and heated at 70° C. past the polymerization gel point of the monomer to form, at the end of 3 hours, spherical phosphorescent articles of this invention, of structure such as is shown in FIG. 1. The articles were separated from the liquid portions of the polymerization medium, washed with water, then with acetone and dried under vacuum. The articles when irradiated by ordinary day light, and subsequently placed in a darkened room, maintained a phosphorescent glow for at least several hours.

Example 4

A first admixture was prepared and maintained under continuous stirring, comprising 1,092 grams of styrene monomer, 108 grams of a mixture comprising 58% by weight of divinyl benzene, the remainder being ethylvinyl benzene, 14 grams of azo-bis-isobutryonitrile, and 60 grams of a particulate fine mesh size orange-yellow phosphor composed of a zinc sulfide-cadmium sulfide complex in granule form. A second admixture was prepared comprising three liters of water with an effective amount of buffer to maintain the pH at 10 and 9 grams of casein. The monomers admixture was added to the stirring aqueous admixture, and heated with continuous stirring past the polymerization gel point to form, at the end of 3 hours, spheroidal articles of this invention having a size of −80+200 mesh, U.S. Standard Sieve. The articles were separated from the liquid portions of the polymerization medium by filtration, were washed with water and then dried. After excitation with ordinary room light, the articles emitted a long-termed yellow phosphorescent glow in a darkened room.

Example 5

A first admixture comprising styrene, divinyl benzene, ethylvinyl benzene, azo-bis-isobutryonitrile and a finely particulate zinc sulfide-cadmium sulfide complex solid phosphor was prepared in quantities and manner identical to that of Example 4. To this first admixture was added 3.6 grams of an oil soluble yellow dye which dissolved in the liquid phase. The suspension of granules was maintained by continuous stirring. In identical manner and composition as that given in Example 4, a second aqueous buffered admixture was prepared. In identical manner to that of Example 4 suspension polymerization was conducted, spheroidal articles produced, separated, washed and dried. The articles, under microscopic examination, comprised a substantially spheroidal body of yellow-dyed translucent polymer and yellow inorganic phosphorescent compound granules located at the surface and about the surface of the polymer body. The articles when irradiated by ordinary day light and then placed in a darkened chamber, exhibited a brilliant yellow long-lived phosphorescent glow.

Various adjuvant substances may usefully be employed in the practice of the process of the present invention, such as viscosity modifiers which are added to the monomers mixture prior to polymerization so as to control the changing viscosity of the copolymerizing organic droplets prior to the gel point; another type of adjuvant material which may usefully be employed in the practice of the present process is the oil-soluble dyes which are added to the monomers-mixture prior to the copolymerization step, to impart to the crosslinked organic body of the end article aesthetically pleasing coloration. Viscosity modifying agents are not necessary to the practice of the present invention, but when used may be used according to the techniques well known in the prior art; dye adjuvants may also be employed according to the teachings of the prior art.

I claim:
1. A composite substantially spheroidal article having phosphorescent properties comprising:
  (a) a solid substantially spheroidal and translucent body comprising a crosslinked organic polymer, and
  (b) a plurality of particulate long-termed phosphorescent inorganic compound granules embedded in the surface of said spheroidal body.

2. An article according to claim 1 wherein said crosslinked organic polymer is a copolymer of from about 60 to 99.9 mol percent of a monovinyl-type monomer and from about 0.1 to 40 mol percent of a polyvinyl-type monomer.

3. An article according to claim 1 wherein said plurality of inorganic phosphorescent compound granules comprises from about .3 to 15 percent by weight of said article.

4. An article according to claim 3 wherein said particulate inorganic phosphorescent compound granules are of average size from about 16 to 400 mesh.

5. An article according to claim 2 wherein said monovinyl-type monomer is styrene and said polyvinyl-type monomer is divinyl benzene.

6. An article according to claim 4 wherein said granules are phosphorescent metal sulfide compound granules.

7. An article according to claim 6 wherein said metal sulfides are selected from the class consisting of calcium, strontium, zinc, cadmium sulfides and their mixtures.

8. A process for the preparation of the composite substantially spheroidal phosphorescent organic polymer article of claim 1, which comprises
  (a) preparing an admixture comprising from about 60 to 99.9 mol percent of a vinyl monomer having a single

group per molecule, from about 0.1 to 40 mol percent of a vinyl monomer having a plurality of

groups per molecule, a vinyl-polymerization initiating catalyst, and particulate inorganic phosphorescent compound granules from about 16 to 400 mesh in average size and in quantities from about .3 to 15 percent by weight of said monomers;
  (b) stirring said admixture formed in step (a) continuously to maintain said granules in suspension;
  (c) preparing an admixture of water, effective quantities of a protective colloid producing agent, and effective quantities of a buffering material so as to maintain the pH of said admixture within the critical range of from about 7 to 14;
(d) mixing the admixtures of steps (b) and (c) with one another continuously and heating from about 40° C. to 90° C. to suspension copolymerize said monomers past the gel point to form solid products;
(e) separating the solid products formed in step (d), which solid products are in the form of puckered surfaced, substantially spheroidal and translucent cross-linked organic polymer articles having a plurality of particulate inorganic phosphorescent compound granules circumferentially disposed at the surfaces of said articles; and
(f) washing and drying said separated articles.

9. A process according to claim 8 wherein said vinyl monomer having a single

group is styrene and said vinyl monomer having a plurality of

groups is divinyl benzene.

References Cited
UNITED STATES PATENTS
3,150,101  9/1964  Heimbuch _____ 252—301.2
3,330,981  7/1967  Aia _____ 252—301.2 X

OTHER REFERENCES
Takatani et al.: "Chemical Abstracts," vol. 59, p. 14172 (1963).

TOBIAS E. LEVOW, Primary Examiner

J. COOPER, Assistant Examiner

U.S. Cl. X.R.

260—41